United States Patent [19]

Giddings

[11] Patent Number: 4,585,523
[45] Date of Patent: Apr. 29, 1986

[54] VAPOR COMPRESSION DISTILLATION APPARATUS

[76] Inventor: Edward H. Giddings, Wichita Falls, Tex.

[21] Appl. No.: 583,593

[22] Filed: Feb. 27, 1984

[51] Int. Cl.⁴ .................................................. B01D 1/22
[52] U.S. Cl. .................................. 202/236; 159/13.1; 159/24.1; 159/28.6; 159/906; 165/46; 165/133; 203/11; 203/89
[58] Field of Search ............... 203/10, 11, 24, 26, 203/86, 89; 159/13 R, 23, 24 R, 28 R, 28 P, 49, DIG. 28, DIG. 32; 202/180, 205, 236; 165/46, 115, 133, 180, DIG. 19

[56] References Cited

U.S. PATENT DOCUMENTS

| | | | |
|---|---|---|---|
| 2,530,376 | 11/1950 | Castle et al. | 159/DIG. 28 |
| 3,161,574 | 12/1964 | Elam | 203/11 |
| 3,227,630 | 1/1966 | Beckman | 203/86 |
| 3,282,797 | 11/1966 | Hammer | 203/11 |
| 3,385,770 | 5/1968 | Roe et al. | 203/89 |
| 3,648,469 | 3/1972 | Chapman | 165/46 |
| 3,860,492 | 1/1975 | Lowi | 203/89 |
| 4,216,820 | 8/1980 | Andrew | 165/115 |
| 4,329,205 | 5/1982 | Tsumura et al. | 159/28 P |
| 4,471,759 | 9/1984 | Anderson et al. | 165/46 |

OTHER PUBLICATIONS

Suratt et al., "Development of Plastic Heat Exchangers for Sea Solar Power Plants", NTIS Publication PB-242 155, Mar., 1975.

Primary Examiner—S. Leon Bashore
Assistant Examiner—Andrew J. Anderson
Attorney, Agent, or Firm—Robert O. Webster

[57] ABSTRACT

A distillation apparatus utilizing a flexible heat exchange medium with a nonwettable condensation face and an opposing readily wettable wicked evaporation face arranged in envelope configurations which provide large heat transfer areas within relatively small volumes.

7 Claims, 9 Drawing Figures

Fig_4

Fig_8

Fig_9

VAPOR COMPRESSION DISTILLATION APPARATUS

BACKGROUND OF THE INVENTION

1. Field of the Invention

This invention relates to an improved heat exchange apparatus for transferring heat from a condensing vapor to an evaporating liquid. More particularly, this invention employs a novel heat transmitting membrane and configuration. One surface of the membrane retains a liquid which is heated to vaporization temperature by the latent heat of condensation transmitted from a vapor being condensed on an opposing surface of the membrane. The configuration employed permits packaging a large heat transfer area into a small volume.

The apparatus herein disclosed is applicable to desalinization of sea water, brine or brackish water. The U.S. Navy uses vapor compression type desalinization units aboard submarine and small craft where daily requirements for fresh water do not exceed 4000 gallons per day. Steam distillation plants in naval service utilize low pressure auxiliary exhaust steam, operate at less than atmospheric pressure and produce from 4000 to 50,000 gallons of fresh water per day. Extremely large, complex and expensive land based desalinization plants producing up to 250 million gallons of fresh water per day have been constructed for geographical areas deprived of fresh water.

A governmental study recently estimated that 3.6 billion gallons of hazardous wastes were injected into the earth by U.S. industry in 1981. Most of this was water contaminated with toxic chemicals. One estimate placed the number of injection well pumps between five and ten thousand, meaning the average injection well pumps around ten to twenty thousand gallons of hazardous wastes per day. Many of these wells are located in the vicinity of aquifiers providing domestic water. Water contaminated with toxic chemicals may be distilled to clarify the water and concentrate the toxic materials for reprocessing or disposal.

A great deal of water used in industrial operations is slightly contaminated and then discarded to the environment. For example, the rinse water from electroplating operations, and the like, may constitute a water pollution problem due to heavy metal ions contained. If the rinse could be ecomomically distilled and reused, the pollution would be reduced and the distilled water would be preferable for reuse and valuable materials could be recovered from the residue.

The subject invention may also be used for certain other purposes not normally employing distillation, such as concentration of fruit and vegetable juices, manufacture of instant coffee or sugar and clarification of volatile solvents.

2. Description of the Prior Art

Improved heat transfer performance, heat transfer enhancement, augmentation or intensification has been attempted since J. P. Joules classic study of condensers in 1861. The number of publications concerning heat transfer enhancement have grown at an exponential rate since 1920. Nearly 500 U.S. patents related to enhancement technology have been issued. Most efforts have been directed to achieve the transfer of the maximum quantity of heat with the minimum expenditure of energy during the distillation process.

Enhancement technology has included passive techniques requiring no direct application of external power and active enhancement techniques which require external power. Passive enhancement techniques include treated heat transfer surfaces, rough surfaces, extended surfaces, swirl flow devices, coiled tubes and surface tension devices. Active enhancement techniques include mechanical aids, vibration of heat transfer surfaces or the fluids, electrostatic fields and flow inducement. Two or more of the techniques may be used to provide a "compound enhancement" greater than that of the individual techniques. The subject invention employs unique materials, surface treatment and configurations which may be generally classified as passive techniques.

Shell-and-tube heat exchangers are commonly used to exchange heat between boiling or condensing fluids and liquids. The plates or tubes are used to separate the fluids and constitute the physical barrier through which heat is transferred from one fluid to another. A variety of structured surfaces are applied to the interior and/or exterior of the tubes or surfaces of plates. The structured surfaces operate to spread liquid films over large surface areas and/or reduce the thickness of the fluid films.

The simplest and most universally understood type of apparatus used to distill water on a large scale is the vapor compression still. The vapor extracted from the feed water is heated to a higher temperature by substantially adiabatic compression. The vapor will therefore condense at a higher temperature than that at which evaporated, and as the vapor condenses, its latent heat of vaporization/condensation is thus recovered and recycled continuously. The net energy input, in the form of work of compression, is only that required to cause heat to flow from the condensing vapor to the evaporating liquid.

By conducting the distillation process in a rarified atmosphere or vacuum, the temperatures required can be lower than if performed at atmospheric pressure. The reduced temperatures required can reduce heat loss from the system and may avoid necessity to preheat the feed liquid or provide heat within the distillation apparatus.

Vapor compression stills operated at atmospheric or higher pressures or within a vacuum are common practice. Such stills operate with small thermal gradients across the heat transfer wall separating the evaporation (heated) side of the wall from the condensation (heating) side of the wall. Substantial effort has been applied to improve the flow of the heat energy across the wall. High thermal conductive materials and exceedingly thin wall sections have been employed. The fluid film on each side of the wall may be almost motionless, thus heat transfer through the film is very poor. The major part of the thermal resistance occurs in the fluid film rather than in the wall. Thicker fluid films are more resistant to heat transfer than thinner fluid films.

The velocity of fluid flow and amount of turbulence in the flow affect heat transfer. Increasing the velocity of fluid flow diminishes the thickness of the fluid film and thus increases heat transfer. Turbulent flow breaks up the fluid film effecting transposition within the flow and thus increases heat transfer. Although there are some disadvantages to excessive turbulence, most recent efforts have been to develop heat exchangers with a certain amount of turbulence so that fluid films may be kept to a minimum thickness.

J. B. Hammer in his U.S. Pat. No. 3,282,797 employs a thin evaporation plate structure with configured surfaces intended to improve the liquid spreading characteristics on the evaporation side. Hammer relies upon the surface tension of the liquid during essentially unobstructed gravity flow over a configured surface to form an exceedingly thin liquid film. The thinness of the film is primarily determined by the pressure gradient due to the surface tension of the liquid which may be augmented by the pressure gradient due to the gravitational force on the liquid.

The preferred embodiment of Hammer's structure is an evaporation plate inclined with the horizontal so the gravitationally induced pressure gradient augments, but does not nullify, the effect of the very particular configuration of the flow distributing surface. The present invention employs substantially vertical surfaces with an essentially random configuration of the flow distributing surface rather than the definitive channel distributing configuration taught by Hammer.

D. W. Elam in his U.S. Pat. No. 3,161,574 employs a thin resinous plastic, water-impermeable film as the heat transfer wall. The plastic film is not wetted by water and must be physically supported and shaped by a containing perforated screen or open mesh material. In addition to providing the required mechanical support to the film, the screen contributes to distribution of the liquid flow over the plastic film and ensures turbulence to the descending liquid flow, preventing formation of a stagnant water film.

Both Elam and the present invention employ thin plastic films or membranes as heat transfer mediums. However, Elam requires a structural support of his plastic film with a supporting and shaping screen; whereas the present invention contemplates a film which will maintain its structural integrety and develop the desired configuration upon imposition of a differential pressure across the film. Further, Elam relies upon rapid turbulent flow induced by a screen to enhance heat transfer, specifically disclaiming a layer of stagnant water, capillary action and a "wicked" evaporating surface as proposed by the present invention.

G. L. Henderson in his U.S. Pat. Nos. 3,414,483 and 3,586,090 employs a gravity induced high velocity to a flowing film of brine to enhance heat transfer to the brine. A free fall of the brine for about three feet over a smooth vertical heat transfer surface is used to reduce film thickness and promote turbulent flow. Henderson also teaches the collection of condensate in traps spaced vertically along the heat transfer wall to control film thickness of the condensed vapor.

In his U.S. Pat. No. 4,094,734 G. L. Henderson discloses a tubular evaporator in which a falling film of viscous brine or viscous solution is provided on the interior surfaces of vertically disposed heat transfer tubes by a pump and distribution system. The distribution system has constant cross-sectional areas to maintain substantially constant velocity of recirculated viscous solutions. Conical distributors are employed to spread and deposit the viscous solutions on the interior surfaces of the heat transfer tubes. Henderson also teaches the collection and removal of condensate in traps hellically disposed about the exterior of the heat transfer tubes.

The free falling flow used by Henderson to achieve a thin film of distilland or viscous solution is not anticipatory of the present invention. Further, the vertical distances required by Henderson necessitate the vertically distributed condensate traps which are not required or anticipated for the present invention.

F. J. Castle et al, in their U.S. Pat. No. 2,530,376 present an apparatus for vacuum distillation employing a readily detachable mesh fabric to distribute a film of distilland to a heated evaporation surface. The mesh fabric is used to increase the sojourn of the distilland, prevent channeling and be readily removeable for cleaning of residue or replacement.

The invention of Castle et al, most closely resembles the present invention in the use of a mesh fabric to distribute the distilland over a heated evaporation surface. However, the basic concept and objective is not anticipatory of that disclosed by the present invention. The present invention does not require a heat source within the apparatus and vaporization of the distilland is effected upon the same structure upon which condensation takes place, not across a spaced relationship as taught by Castel et al.

To summarize:

Distillation processes in current use may be performed in a rarified or vacuum environment. Thin films or membranes have been used as heat transfer mediums. Contorted and/or porous surfaces have been used to distribute distilland, induce flow as a thin film and promote turbulence. Present distillation processes usually require preheating the distilland or addition of heat or mechanical energy during the distillation process. Relatively expensive materials and equipment are currently used for distillation apparatuses which are not particularly efficient.

The theoretical energy required to extract one thousand gallons of distilled water from two to three times that amount of sea water is around four kilowatt hours. Even large and well designed sea water distillation plants in current use require at least twenty times the theoretical energy, i.e., are five percent efficient or less. Energy requirements are minimal where distillation can be effected at low temperatures.

The greater the heat transfer area, the less the temperature and pressure difference requires to cause a given quantity of heat flow. Very large heat transfer areas are required to produce substantial quantities of condensate at the lower temperatures. Given unlimited heat transfer area, the ideal energy required to distill water with only a trace of dissolved matter would approach zero. Clearly, there is a trade-off between energy cost and the capital cost of surface area made available for heat transfer. There are no methods or equipment presently available which can provide the large heat transfer areas to efficiently distill large quantities of sea water at low temperatures at acceptable capital and operational costs.

SUMMARY OF THE INVENTION

In recognition of the need for means to efficiently produce fresh water from sea water, it is hereby proposed to provide an improved apparatus for distillation.

It is thus an objective of this invention to provide a very large area for heat transfer applicable to a distillation process at an extremely low cost.

Another object of this invention is to provide an efficient heat transfer medium between a vapor condensing side and an evaporation side of a heat transferring membrane adapted to utilize the latent heat of condensation to effect vaporization of a feed liquid.

Another object is to provide a novel and extremely low cost means for distributing a film of distilland over an evaporation surface.

Another object is to provide a geometry or configuration of a heat transfer area by which a very large heat transfer area may be packed within a small volume to minimize heat loss to surrounding environment and reduce the capital cost of a containing structure.

A still further object is to provide a distillation apparatus which is operational at low temperatures and differential pressures thus requiring minimal energy input.

Briefly, in accordance with the present invention there is provided an apparatus by which distillation may be practiced at low temperatures and within a vacuum. The apparatus may be employed most advantageously to extract fresh water from warm sea water without preheating the feed sea water or requiring substantial compression of the vapor.

As an example, warm sea water, which may be up to 85 degrees F. in the equatorial zone, is introduced into a low pressure or vacuum environment wherein free air and gases are extracted from the sea water. The warm sea water is then distributed as a thin film over a wicked evaporation surface. The thin film of sea water is warmed by conduction of heat from the evaporation surface effecting vaporization of part of the thin film of sea water as it moves over the wicked evaporation surface.

The vapor is withdrawn and unevaporated residue of the sea water is extracted upon draining from the evaporation surface. The withdrawn vapor is compressed to a slightly higher pressure and temperature and introduced to a condensation surface where upon it condenses. The heat of condensation is imparted to the condensation surface from whence it is conducted to and provides heat to the evaporation surface. The condensate, resulting from condensation of the vapor is extracted as the fresh water product of the distillation process.

The proposed apparatus for practicing distillation comprises an enclosing, heat retaining, shell within which a pressure lower than atmospheric pressure is maintained by a vacuum pump or other suitable extraction means. Two zones are created within the shell by a separating, thin, impervious, heat transmitting membrane. An evaporization zone is defined by an evaporization face of the membrane. The evaporization face has a wicked surface by which the feed liquid is distributed as a thin film over the evaporization face. The opposite face of the membrane is a nonwettable condensation surface. In a vapor compression process, a vapor conducting conduit or duct connects the evaporization zone to the condensation zone. Within the connecting duct is a fan or compressor which withdraws vapor from the vaporization zone and delivers the vapor at a higher pressure and temperature into the condensation zone.

The particular novelty of the proposed apparatus resides in the combination of the wicked surface intimately related to the nonwettable surface of the thin heat transmitting membrane and the unique configuration of the membrane into an envelope or closely arranged walls. The unique configurations permit a large heat transfer area to be enclosed within a small volume, with attendant savings in capital equipment and operational costs.

Other objects and advantages of the invention will become readily apparent to one skilled in the art from the following detailed description of preferred embodiments of the invention when read in connection with the accompanying drawings, in which like reference characters designate like parts.

DESCRIPTION OF THE PREFERRED EMBODIMENTS

Figure 1:
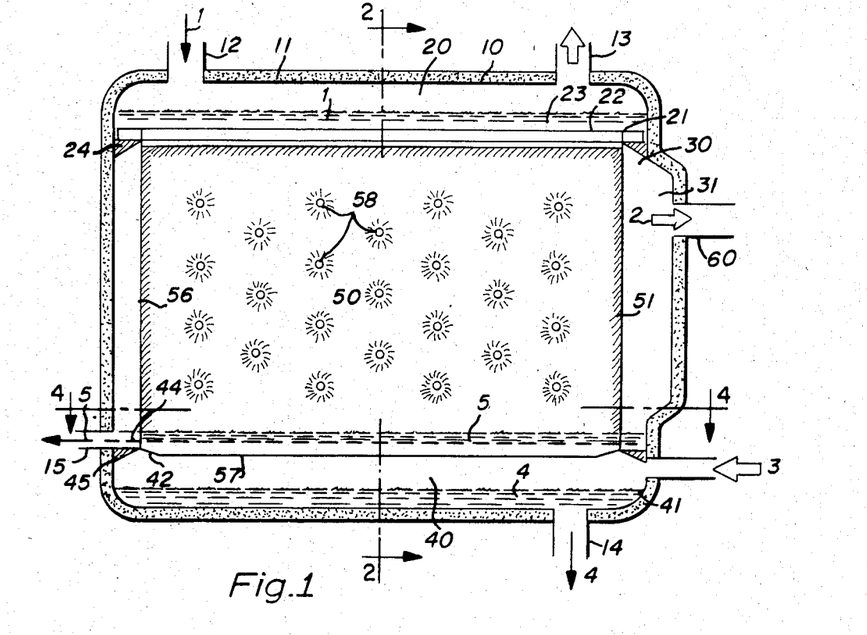
FIG. 1 is a schematical vertical sectional view through a distillation apparatus according to the present invention.

Referring now to the figures, and more particularly to FIG. 1 where is shown a diagrammatic illustration of a vertical sectional view of a distillation apparatus in accordance with the present invention. There is shown a still for converting impure water into pure or potable water, having a pressure or vacuum containing housing or shell 10 with heat retentive insulation 11. The interior of the shell 10 is divided into a feed chamber 20, an evaporating chamber 30 and a condensing chamber 40; by a feed distribution tray 21 and impermeable heat conducting membranes 51 in the form of inverted sacks or envelopes 50.

The evaporating chamber 30 includes the spaces between the envelopes 50 and the vapor collection manifold 31. The condensing chamber 40 includes the interior spaces of the envelopes 50 and the lower portion 41 of the shell 10 connecting the interior spaces of the envelopes 50.

A feed inlet 12 is provided through which the feed liquid 1 is introduced into the feed chamber 20. An evacuating outlet 13 is provided through which air and noncondensable gases accompanying the feed liquid 1 are withdrawn from the shell 10 by a suitable evacuation means, such as an ejector or vacuum pump (not shown). The interior of the shell 10 is thus maintained at a pressure less than atmospheric pressure. A condensate outlet 14 is provided to lower portion 41 of the shell 10, comprising part of the condensing chamber 40, through which condensate may be withdrawn.

Thin plastic or metallic membranes 51 are used to define and separate the evaporating and condensing chambers 30 and 40. The membrane material must be impermeable to fluid flow, have good heat conductivity, be inert to the feed liquid and its vapor and be dimensionally stable and be of sufficient strength to withstand the loads imposed by the differential preasure between the evaporating and condensing chambers.

Thin metallic heat transfer membranes have been used in heat exchangers and stills. A heavy duty aluminum foil may prove a satisfactory material but would be more expensive than plastic sheet and may introduce problems of fatigue, corrosion and poor tear resistance. Despite their lower thermal conductivities, polymer or copolymer plastics are expected to provide the least expensive and most suitable membrane material. The plastic material must be readily formed into an envelope structure, have the flexability to conform into the desired configuration, bond intimately to a porous wick material and be inherently nonwettable. A plastic membrane material may be loaded with or contain heat conductive particulates such as graphite aluminum powder or like high heat conductive filler, to increase the overall heat conductivity of the membrane. It is expected that membrane thickness will vary from 0.0005 to 0.005 inches, depending upon the material used.

The evaporation face 52 of the membrane 51 toward the evaporating chamber 30 requires a porous, permeable or "wicked" surface 53 which is readily wettable by the feed liquid flowing across its surface. Alternately, a thin coating of fibers or granular material may be bonded or heat-sealed to the evaporation face 52 or a thin layer of a wick material 54 such as a porous plastic paper a woven fabric or a mat of randomly oriented fibers may be applied to provide a wicked surface. The material applied to the evaporation face 52 should be highly heat conductive, chemically inert to and readily wetted by the feed liquid 1. The objective is to provide an evaporation face 52 to the membrane 51 which distributes the feed liquid 1 introduced thereto as a thin film and restrain flow of the feed liquid to increase residence time, heat reception and vaporize the volatile constituents.

The condensation face 55 of the membrane 51 toward the condensing chamber 40 should be nonwettable so droplets of condensate 4 are formed as the pressurized vapor 3 is cooled and condenses on the condensation face 55. The nonwettable characteristic is desired to prevent a film of condensate forming on the condensation face 55 which would impede transfer of heat from the pressurized vapor 3 to the membrane 51 and through the membrane 51 to the thin film of feed liquid 1 on the evaporation face 52 of the membrane 51.

In the embodment of the present invention illustrated in FIG. 1, FIG. 2, FIG. 3 and FIG. 9, the chamber defining membranes 51 are arranged to form sacks or envelopes 50. In one manner of construction, the membrane 51 is doubled over to form a closed top. The interior condensation faces 55 are joined along their lateral edges 56, by cementing, heat sealing or any other appropriate method, to form an envelope 50 with an open bottom 57. The two inner condensation faces 55 are joined together at a number of spots 58 or along vertical lines 60 at spaced intervals. Imposition of the differential pressure between the evaporation and condensation faces 52 and 55 causes the membrane 51 of the envelope 50 to balloon outward, the envelope surfaces assuming a quilted, waffled or columnar form. The joined spots 58, or lines 60, are located to limit the envelope's ballooned thickness, thus limiting the distance between the internal condensation faces 55.

If the thickness of the inflated envelopes are limited to one-half an inch, the envelopes may be spaced at about ⅝ inch intervals, or eighteen envelopes per foot. Assuming envelopes with two foot by three foot active heat transfer faces located at ⅝ inch intervals within an eight foot long unit, such a unit would contain 1728 square feet of heat transfer surface and would distill something over 100 gallons of water per hour with a one degree F. temperature difference across the heat transfer surfaces. A factor limiting the minimum thickness of an inflated envelope will be a tendency of the liquid condensate 4 to flood a too narrow bottom opening 57 interfering with proper drainage of the condensate 4 and entry of pressurized vapor 3. Preferred drainage paths for condensate 4 may be provided should they be required.

Figure 2:
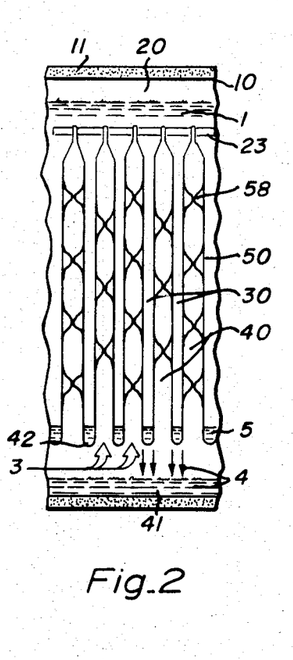
FIG. 2 is a sectional view taken along line 2—2 of FIG. 1 showing the configurations and special relationship of membrane envelopes in accordance with the invention.
Figure 3:
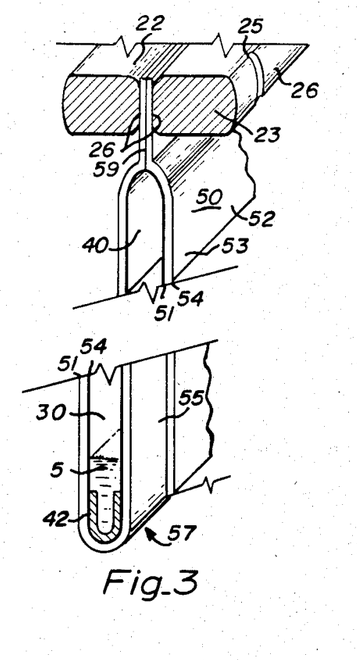
FIG. 3 illustrates the upper and lower extremities of a membrane envelope at greatly enlarged scale.

The liquid retentive floor 22 of the feed distribution tray 21 is composed of a series of bars 23 disposed across the shell 10 and resting on support brackets 24. The bars 23 retain the closed upper edges of the envelopes 50 providing support for the envelopes 50 as shown in FIG. 2. Tabs 59 formed of extensions of the envelope membrane 51 and wick material 54 or wick material 54 alone may constitute envelope supporting extensions retained by the bars 23 as shown in FIG. 3. Grooves or notches 25 are provided in the clamping faces 26 of the bars 23 through which feed liquid 1 is distributed to the wicked evaporation faces 52 of the envelopes.

Figure 4:
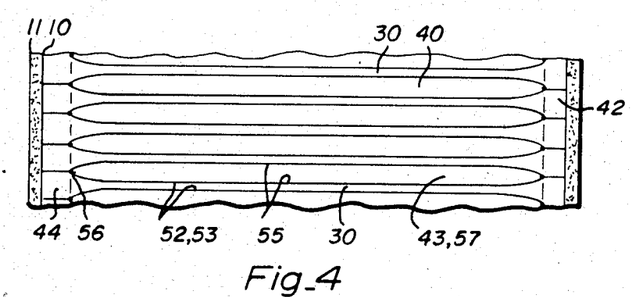
FIG. 4 is a sectional view taken along line 4—4 of FIG. 1 showing the configurations and spacial relationship of membrane envelopes at their lower extremities.

The lower extremities of the envelopes 50 are joined to trough like slats 42 between adjacent envelopes, in which unevaporated residue 5 of the feed liquid 1 collects. The slats 42 are necked down laterally, as illustrated in FIG. 4, such that a gap 43 between adjacent slats 42 defines the shape of the bottom openings 57 of the envelopes 50. The end portions 44 of adjacent slats 42 are in intimate contact and rest on shelves 45 to form a liquid residue 5 retaining floor. A residue outlet 15 is provided through the shell 10 for removal of the residue 5.

Figure 5:
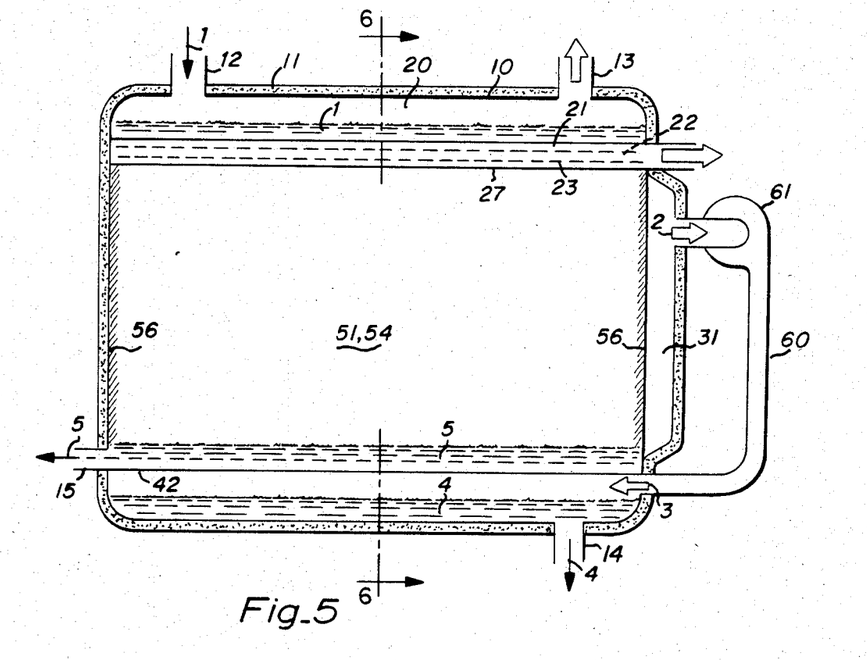
FIG. 5 is a schematical vertical sectional view through a vapor compression distillation embodiment of the invention.
Figure 6:
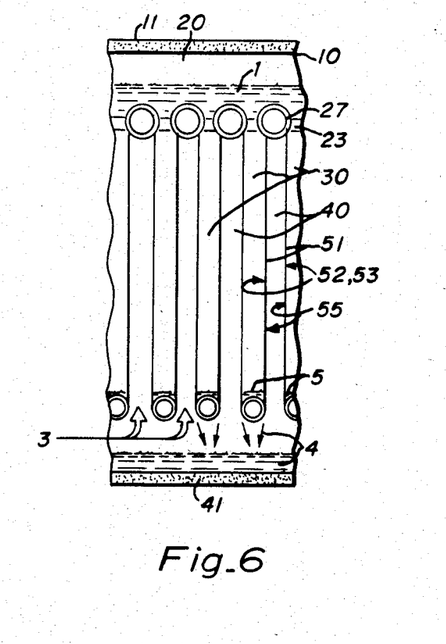
FIG. 6 is a sectional view taken along line 6—6 of FIG. 5 showing the configuration and spacial relationship of the heat transmitting membranes.
Figure 7:
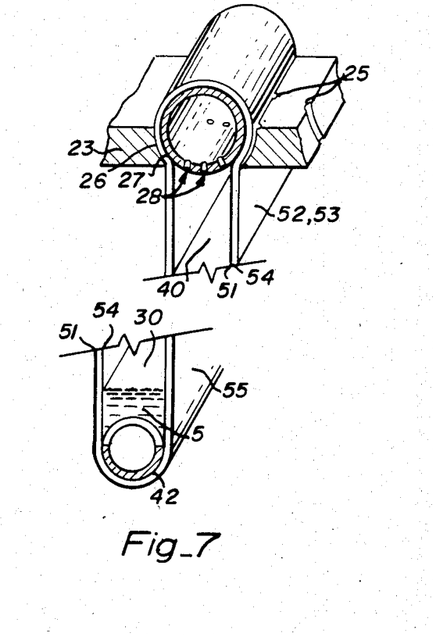
FIG. 7 illustrates the upper and lower arrangements of the heat transmitting membranes at a greatly enlarged scale.

Another embodiment of the present inventioh is illustrated by FIG. 5, FIG. 6 and FIG. 7. A continuous membrane 51 is used to separate and define the evaporating and condensing chambers 30 and 40. The evaporating chamber 30 is in communication with the condensing chamber 40 through a suitable duct structure 60 having a vapor compressor 61 interposed therein. The membrane 51 has an evaporation face 52 with a wicked surface 53 toward the space constituting the evaporating chamber 30. An opposing nonwettable condensation face 55 of the membrane is directed toward the space constituting the condensing chamber 40. The continuous membrane 51 may be successively wrapped over supporting tubes 27 and troughed slats 42 with vertical edges 56 sealed to the shell 10 or bonded together along the vertical edges 56 of the condensation faces 55. The nonwettable condensation faces 55 of the membrane 51 is disposed against the supporting tubes 27 and the wicked evaporation face 52 is disposed toward the alternating slats 42.

The supporting tubes 27 and bars 23 with clamping faces 26 conforming to the tube contours, are disposed across the shell 10 and rest on support brackets 24 to compose the liquid retentive floor 22 of the feed distribution tray 21. The support tubes 27 are provided with holes 28 through their walls in communication with the space of the condensing chamber 40. Air and noncondensable gases may be purged from the condensing chamber 40 by extraction through the holes 28 and tubes 27 with an appropriate evacuating ejector or pump (not shown).

Figure 8:
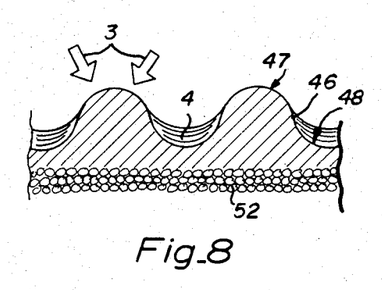
FIG. 8 is a partial sectional view of an alternative configuration of the heat transmitting membrane.
Figure 9:
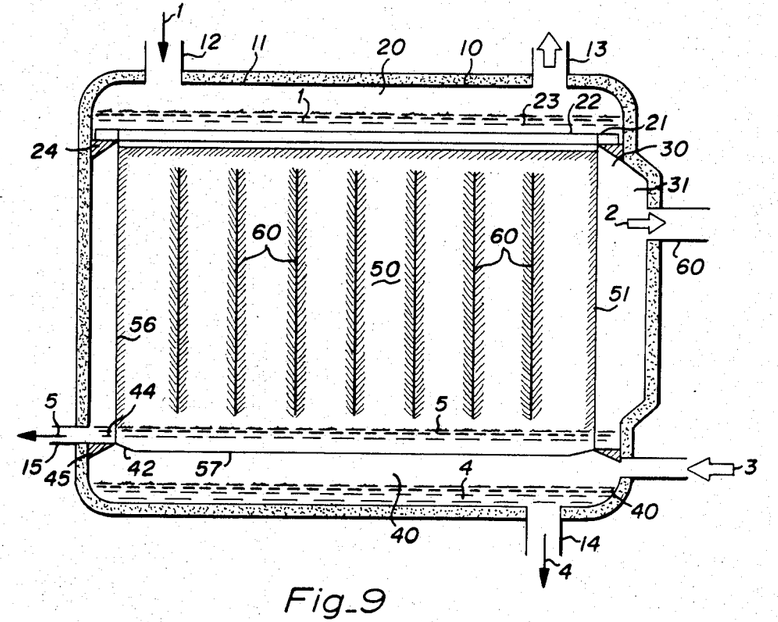
FIG. 9 is a schematical vertical sectional view through a distillation apparatus according to the present invention.

The continuous membrane and configuration illustrated by FIG. 5 affords an excellent opportunity to apply a compound heat transfer enhancement means as depicted in FIG. 8. A vertically oriented fluted surface 46 will enhance the condensing mechanism hereby surface tension forces pull the condensate 4 from the convex surfaces 47 to the concave regions 48 where it is drained by gravity. The very thin condensate films on the convex surfaces 47 enhance the condensing coefficient 3 to 8 times the average of flat surfaces. A dispersed flow film boiling may be achieved on the opposing evaporation face 52 by a variety of structured surfaces including a sintered porous metallic matrix surface as described by Milton in U.S. Pat. No. 3,587,730.

As an operational example of the dislosed distillation apparatus assume, its use for the extraction of fresh water from sea water in the equatorial zone of the Earth, as follows:

Warm, 70 degree to 85 degree F., sea water feed liquid 1 is admitted into the feed chamber 20 through the feed inlet 12. Free air and gases accompanying the feed liquid 1 are extracted from the feed chamber 20 through the evacuating outlet 13 which maintains the interior of the shell 10 at less than atmospheric pressure, say an absolute pressure of one psi or less. The feed liquid 1 within the feed distribution tray 21 trickles by gravity down through the notches 25 in the bars 23, forming the floor 22 of the feed distribution tray 21, to wet the wick material 54 and be distributed as a thin film over the evaporation face 52 of the membrane 51. During flow of the feed liquid 1 over the wicked evaporation face 52 part of the feed liquid evaporates and the resulting vapor 2 is withdrawn from the evaporating chamber 30 through the duct 60 and is delivered at a higher pressure 3 into the condensing chamber 40 by the compressor 61. Accordingly, the evaporating chamber 30 is operated at a lower pressure than the condensing chamber 40. In a vacuum unit operating with 80 degree F. sea water feed liquid and at about 0.5 psia, the corresponding difference between the evaporating and condensing chambers would be about 0.04 psi.

As the pressurized vapor 3 floods the condensing chamber 40, it enters the interior of the envelopes 50 through the bottom openings 57 and condenses on the inner condensation faces 55. The latent heat of condensation released during condensation of the pressurized vapor 3 is conducted through the envelope's membrane 51 to the evaporation face 52 of the envelope in an amount sufficient to continue evaporation of the feed liquid 1 flowing over the wicked evaporation face 52 of the envelope. The pressurized vapor 3 is condensed into liquid form as substantially pure water condensate 4 that drains from the interior of the envelopes into the lower portion 41 of the condensing chamber 40, from which the pure water condensate 4 is withdrawn through the condensate outlet 14. An excess of feed liquid 1 is supplied to the evaporating chamber 30 thus only a portion is vaporized, the remainder draining as residue 5 into the troughed slats 42 for collection and removal through the residue outlet 15.

Although low temperature uses of the present invention have been emphasized, the improvements disclosed are also advantageous at elevated temperature processing consistent with the characteristics of the materials used. Other processes commonly used in conjunction with distillation processes may be used without departing from the scope and spirit of the invention herein disclosed. For example, compressed vapor may be desuperheated prior to introduction into the condensing chamber. Or the feed liquid may be preheated with the heat provided by condensate and/or residue to retain the heat energy within the system.

Whereas certain forms of the invention have been shown and described it should be understood that this description should be taken in an illustrative or diagrammatic sense only. There are many variations and modifications which will be apparent to those skilled in the art which will not depart from the scope and spirit of the invention. I, therefore, do not wish to be limited to the precise details of construction or materials set forth, but desire to avail myself of such variations and modifications as come within the scope of the appended claims.

What I claim is:

1. A distillation apparatus comprising:
    an outer heat insulated housing capable of being pressurized having an upper feed chamber and a lower chamber;
    a plurality of parallel horizontally disposed bars supported within said housing and providing a liquid retaining floor of said feed chamber and defining the upper extremity of said lower chamber;
    a plurality of horizontally disposed slats supported within said housing below, parallel to and evenly spaced with respect to said bars;
    a heat exchange medium supported by and vertically disposed between said bars and said slats, dividing said lower chamber into an evaporating chamber and a condensing chamber;
    said heat exchange medium being a plurality of heat transmitting membranes of thin plastic sheet material, impervious to fluid transfer therethrough, one surface of said membranes being readily wettable by a feed liquid and located contiguous to said slats, the opposing surface of said membranes being nonwettable by a condensing vapor or its condensate;
    means for introducing a feed liquid into said feed chamber;
    means for distributing said feed liquid onto said readily wettable evaporation surface of said membranes as a thin film;
    means for introducing saturated vapor, at a temperature exceeding that of said feed liquid into said condensing chamber;
    means for removing vapor from said evaporating chamber;
    means for extracting excess feed liquid from said evaporating chamber;
    means for extracting condensate from said condensing chamber; and
    means for maintaining the interior of said housing at a pressure less than atmospheric.

2. The distillation apparatus of claim 1 wherein said heat exchange medium is configured as a plurality of vertically disposed envelopes constructed of said heat transmitting membranes, the nonwettable condensation surfaces being sealed at top and lateral edges to define the interior of said envelopes, the bottoms of said envelopes being open and in common communication as said condensing chamber, the readily wettable exterior of said envelopes contiguous to said slats and defining said evaporating chamber.

3. The distillation apparatus of claim 2 wherein said nonwettable interior surfaces of said envelopes are joined at a plurality of spaced spots to provide a waffled configuration to said envelopes upon imposition of a pressure within said envelopes exceeding the pressure external of said envelopes.

4. The distillation apparatus of claim 2 wherein said nonwettable interior surfaces of said envelopes are joined at a plurality of horizontally spaced vertically extending lines to provide a columnar configuration to said envelopes upon imposition of a pressure within said envelopes exceeding the pressure external of said envelopes.

5. The distillation apparatus of claim 1 having a duct structure between said evaporating chamber and said condensing chamber, said duct structure having a compression means therein whereby vapor removed from said evaporating chamber is introduced into said condensing chamber at a higher pressure and temperature.

6. A distillation apparatus comprising:
- an outer heat insulated housing capable of being pressurized having an upper feed chamber and a lower chamber;
- a plurality of horizontally disposed tubes alternately spaced, parallel to and supported along lateral contacting surfaces by
- a plurality of parallel horizontally disposed bars supported within said housing, which with said tubes provide a liquid retaining floor of said feed chamber and defining the upper extremity of said lower chamber;
- a plurality of horizontally disposed slats supported within said housing below, parallel to and alternately spaced with respect to said tubes;
- a heat exchange medium disposed within said lower chamber, dividing said lower chamber into an evaporating chamber and a condensing chamber;
- said heat exchange medium being a heat transmitting membrane of thin plastic sheet material, impervious to fluid transfer therethrough, one surface of said membrane being readily wettable by a feed liquid, the opposing surface of said membrane being nonwettable by a condensing vapor or its condensate;
- said membrane wrapped in a continuous fashion alternately over said tubes and under said slats thus providing a plurality of substantially vertical membranes within the lower chamber, the readily wettable surfaces being contiguous to said slats and directed toward said evaporating chamber, the opposing nonwettable surfaces being contiguous to said tubes and directed toward said condensing chamber, thus defining alternating portions of said evaporating chamber and said condensing chamber across said membrane;
- means for introducing a feed liquid into said feed chamber;
- means for distributing said feed liquid from said feed chamber upon said readily wettable evaporation surfaces of said membrane as a thin film;
- means for introducing saturated vapor, at a temperature exceeding that of said feed liquid, into said condensing chamber;
- means for removing vapor from said evaporating chamber;
- means for extracting excess feed liquid from said evaporating chamber;
- means for extracting condensate from said condensing chamber; and
- means for maintaining the interior of said housing at a predetermined pressure.

7. The distillation apparatus of claim 6 having a duct structure between said evaporating chamber and said condensing chamber, said duct structure having a compression means therein whereby vapor removed from said evaporating chamber is introduced into said condensing chamber at a higher pressure and temperature.

* * * * *